July 7, 1931. C. C. GATES 1,813,698
ENDLESS V-SHAPED BELT
Filed July 23, 1928
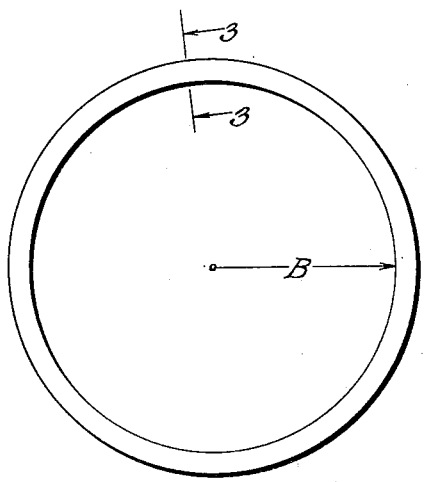
Fig.1.
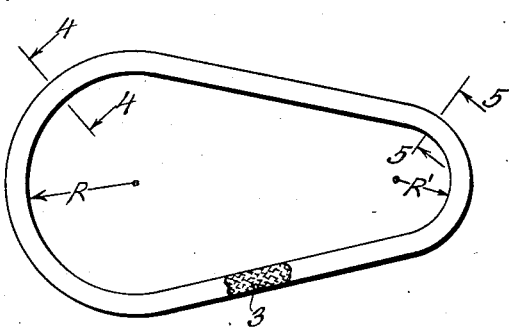
Fig.2.
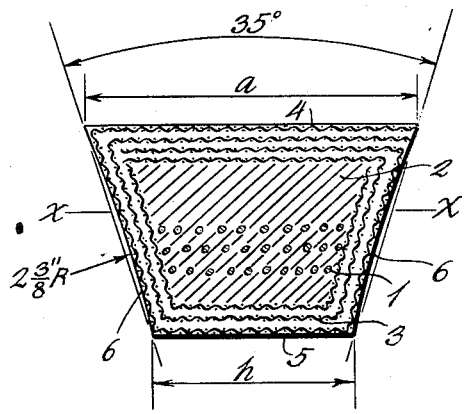
Fig.3.
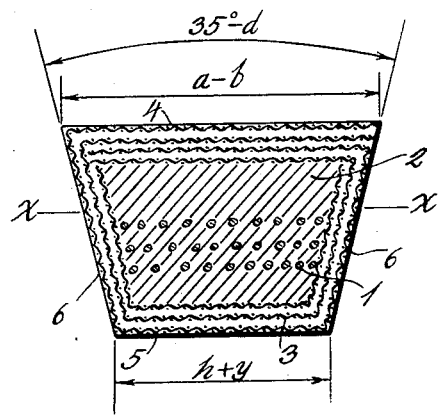
Fig.4.
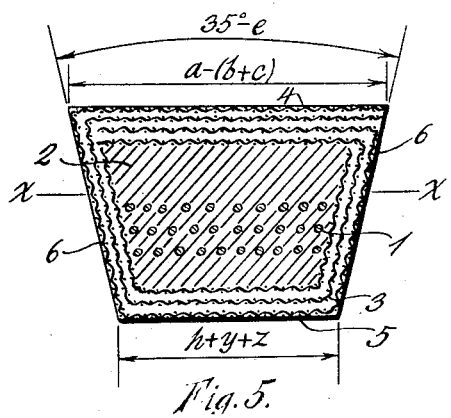
Fig.5.
Inventor
Charles C. Gates.
By 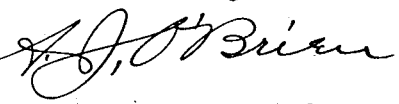
Attorney Patented July 7, 1931

1,813,698

UNITED STATES PATENT OFFICE

CHARLES C. GATES, OF DENVER, COLORADO, ASSIGNOR TO THE GATES RUBBER COMPANY, OF DENVER, COLORADO, A CORPORATION OF COLORADO

ENDLESS V-SHAPED BELT

Application filed July 23, 1928. Serial No. 294,773.

This invention relates to improvements in endless V-shaped belts of the type shown and described in U. S. Letters Patent No. 1,400,539, granted to me on December 20, 1921.

The type of belt to which this invention relates is constructed of rubberized cord which forms the center portion of the belt and which gives it strength while the outer or wearing surface consists of rubberized fabric and rubber, the fabric being cut on the bias so that the warp and woof will extend at oblique angles to the length of the belt.

Belts of this type are preferably formed in the shape of a round ring and on account of their flexibility can be used in connection with pulleys of almost any diameter.

Belts of this type in common with all materials have a neutral axis or plane along which the material is subjected to neither tension or compression during flexure. On the convex side of this axis the material is under tension and on the concave side it is under compression when the belt is bent at a curvature greater than its normal curvature. It is evident that the material on the convex side of the neutral axis will be stretched as the radius of curvature is decreased and compressed on the concave side of the axis, the width of the belt will therefore decrease on the convex side and increase on the concave side while remaining of a constant width in the plane of the neutral axis. It is therefore evident that if the inclined sides of such a belt are made straight when the belt has its normal curvature that they will assume a convex form when bent at a smaller radius of curvature. When belts of this kind are employed with pulleys having V-shaped grooves, the convex sides will contact with the sides of the groove along a line only which is objectionable. In order that the sides of such a belt shall make uniform contact with the sides of the groove, it is evident that the sides must be slightly concave when the belt is in its normal shape so that when the material has been distorted by bending the sides will become straight and will make uniform contact with the inclined sides of the groove in the pulley.

In order to more fully describe the invention so that the same will be more clearly understood, reference will now be had to the accompanying drawings in which the same has been illustrated, and in which:

Fig. 1 is a view showing the belt in its normal form;

Fig. 2 is a view showing the form that the belt assumes when used to transmit power between pulleys of different diameters;

Fig. 3 is a section taken on line 3—3, Fig. 1 and shows the normal shape of the cross section;

Fig. 4 is a section taken on line 4—4, Fig. 2, and shows the shape of the cross section when the curvature of the belt has been increased to fit an average sized pulley; and Fig. 5 is a section taken on line 5—5, Fig. 2, and shows the shape of the cross section when the curvature is increased beyond that shown in Fig. 4.

The belts are formed in circular moulds and have the shape shown in Fig. 1 when they are removed. The cross section of the belt in its normal shape has been illustrated in Fig. 3 in which numeral 1 represents a plurality of substantially inelastic cords that form the center of the belt, the shaded portion designated by numeral 2 represents rubber composition while numeral 3 represents layers of rubberized fabric which is cut on the bias so that the warp and woof form oblique angles with the length of the belt. The top surface 4 and the bottom surface 5 are parallel but of different width, the top being considerably wider than the bottom. In the drawings the width of the outside or top surface has been designated by $a$ and that of the inside or bottom by $h$. The inclined side walls 6 are concave and are preferably curved on a radius of 2⅜" and lines joining the edges of the inner and outer surfaces include an angle of about thirty-five degrees or any other size.

Let us now assume that the belt is curved about a pulley having a radius R, which is smaller than the radius B. The belt will flex and in common with all materials will be put under tension on the convex side and under compression on the concave side of a plane $x$—$x$, which separates the material under compression from that under tension and will be designated as the "neutral plane" or axis. When the curvature is increased from the normal, side 4 will decrease in width due to the stretching which takes place, the normal width $a$ is reduced by $b$ while the width of the bottom surface 5 is increased by $y$. When curved around a pulley having a radius R the sides 6 become substantially straight or are still slightly concave. If the radius of curvature is reduced to R', the width of surface 4 is decreased by $c$ and the width of surface 5 is increased by $z$. In the latter, which may be considered the extreme case, the sides 6 may become slightly convex. There is, of course, only a single curvature that will make sides 6 perfectly straight, but since the belt is made of rubber, it yields readily and gives substantially uniform pressure in connection with properly constructed pulleys of average size. The angle included between sides 6 becomes gradually smaller as the radius of curvature increases in the manner indicated in the drawings where $c$ is smaller than $d$.

It will be seen from the above that by making the belt with inclined sides that are normally concave, better results are obtained than if the sides were made straight as in the latter case, they will become convex when the belt is applied to a pulley of average diameter.

Although the particular belt that has been illustrated is provided with a central core formed from substantially inextensible cords, the advantages of the concave sides will be present in belts constructed in other ways, especially if rubber forms a part of the material and therefore this invention is broad enough to include all V-shaped belts comprising in their construction yieldable material such as rubber.

Having described the invention what is claimed as new is:

1. An endless solid belt of yieldable material having its inner surface narrower than the outer surface and side walls transversely concave.

2. An endless solid V-shaped belt of yieldable material having transversely concave side walls.

3. An endless solid belt of yieldable material provided with a substantially inextensible member located along its neutral axis, said belt having its side walls outwardly inclined and transversely concave.

4. A vulcanized solid V-shaped belt whose inclined side walls are transversely concave.

5. An endless vulcanized solid V-shaped belt having substantially nonelastic cords at its neutral axis and whose opposite inclined side walls are normally concave.

6. An endless vulcanized solid V-shaped belt having substantially nonelastic cords at its neutral axis and whose opposite inclined side walls are composed of rubberized, woven fabric whose warp and woof are diagonal to the length of the belt and whose side walls are transversely concave.

7. An endless vulcanized side-driving belt whose opposite walls are transversely and uniformly concave to conform to a curve of suitable radius so that when the belt is flexed around pulleys there will be a tendency to fill the concavities for the purpose set forth.

In testimony whereof I affix my signature.

CHARLES C. GATES.